United States Patent
Ma

(10) Patent No.: US 7,177,373 B2
(45) Date of Patent: Feb. 13, 2007

(54) CONTINUOUS SELF-CALIBRATION OF INTERNAL ANALOG SIGNALS

(75) Inventor: David SuitWai Ma, Cary, NC (US)

(73) Assignee: Infineon Technologies AG, Munich (DE)

( * ) Notice: Subject to any disclaimer, the term of this patent is extended or adjusted under 35 U.S.C. 154(b) by 813 days.

(21) Appl. No.: 10/216,012

(22) Filed: Aug. 9, 2002

(65) Prior Publication Data
US 2004/0028152 A1    Feb. 12, 2004

(51) Int. Cl.
  H04L 25/06    (2006.01)
  H04L 25/10    (2006.01)
(52) U.S. Cl. ....................................................... 375/317
(58) Field of Classification Search ................ 375/317; 341/118
  See application file for complete search history.

(56) References Cited

U.S. PATENT DOCUMENTS

| | | | | |
|---|---|---|---|---|
| 3,927,309 A * | 12/1975 | Fujiwara et al. | ............. | 702/193 |
| 4,594,711 A * | 6/1986 | Thatte | ......................... | 714/728 |
| 4,782,404 A * | 11/1988 | Baba | ....................... | 360/77.07 |
| 4,784,060 A | 11/1988 | Weisgerber et al. | ........ | 101/426 |
| 4,823,339 A * | 4/1989 | Bigo et al. | .................. | 370/287 |
| 4,829,593 A | 5/1989 | Hara | ........................... | 455/234 |
| 5,225,764 A | 7/1993 | Falater | ......................... | 322/28 |
| 5,436,853 A * | 7/1995 | Shimohara | .................... | 702/79 |
| 6,169,335 B1 | 1/2001 | Horsak et al. | ............. | 307/10.1 |
| 6,459,663 B1 * | 10/2002 | Hayami | .................... | 369/44.29 |
| 6,492,921 B1 * | 12/2002 | Kunitani et al. | ............ | 341/118 |

FOREIGN PATENT DOCUMENTS

WO    WO 01/28125    4/2001

\* cited by examiner

Primary Examiner—Chieh M. Fan
Assistant Examiner—Jia Lu
(74) Attorney, Agent, or Firm—Brinks Hofer Gilson & Lione

(57) ABSTRACT

A method and apparatus for monitoring and adjusting an analog signal of an operating circuit. The apparatus includes a control circuit, an analog-to-digital converter, and a comparator. The control circuit has an analog generator for generating the analog signal and an adjusting circuit for adjusting the strength of the analog signal. The analog-to-digital converter receives the analog signal and converts the analog signal to a digital signal. The comparator then compares the value of the digital signal to a predetermined value and generates a comparator signal. The adjusting circuit then receives the comparator signal and adjusts the strength of the analog signal based upon the value of the comparator signal. The method includes generating the analog signal, converting the analog signal to a digital signal, comparing the value of the digital signal to a predetermined value and adjusting the strength of the analog signal.

5 Claims, 2 Drawing Sheets

CONTINUOUS SELF-CALIBRATION OF INTERNAL ANALOG SIGNALS

BACKGROUND

Semiconductor devices are currently in widespread use in a variety of electronic components. Semiconductor devices may be used for a variety of reasons, such as to retain information, as in a non-volatile memory device, or to perform a calculation, such as in a microprocessor or in a digital signal processor.

Semiconductor devices consume a certain amount of power to perform their tasks. Typically, the amount of power they consume is regulated by the internal or external voltage at which they operate. An external voltage is supplied to a semiconductor device for operation. The semiconductor device includes internal circuitry which receives the external voltage at an external input. The external voltage is then regulated by the internal circuitry to a suitable level for the semiconductor device to operate. The regulated voltage, or internal voltage, is then supplied to the semiconductor device. Often, the internal voltage supplied to a semiconductor device varies considerably depending on a number of factors, such as the manufacturing process for the die, the fabrication lot for the die, the operating conditions of the device, and the environmental conditions of the device. In order to compensate for these variations, semiconductor devices are manufactured with fuses which can be trimmed and set to a specific value in order to supply the semiconductor device with a set voltage.

The specific value that the fuses are to be trimmed to is determined by statistical analysis of the manufactured semiconductor devices across different process corners. These statistical data are then collected and a trim value is determined either based on averages or based on whichever value will give the best trade off. Once the fuses are trimmed, the trim setting cannot be changed. As a result, a trimmed device will not be able to compensate for further changes in operating conditions or environmental conditions by changing the trim value for the regulator. The voltage generated by the trimmed voltage regulator is therefore no longer optimized for new conditions. This may result in sub-optimal operations in some environments, limiting the range of conditions that a device could be used or sold, or limiting the possible scope of application for the device. As a result, the semiconductor device may receive a varying or unstable amount of voltage due to changing conditions. Thus, there is a need for a device or method which be used to supply a stable and consistent voltage to a semiconductor device even under changing conditions.

SUMMARY

The present invention is defined by the following claims, and nothing in this section should be taken as a limitation on those claims. By way of introduction, the preferred embodiments described below relate to a continuous self-calibrating circuit for monitoring and adjusting an analog signal of an operating circuit. The continuous self-calibrating circuit includes a control circuit, an analog-to-digital converter, and a comparator. The control circuit has an analog generator for generating the analog signal and an adjusting circuit for adjusting the strength of the analog signal. The analog-to-digital converter receives the analog signal and converts the analog signal to a digital signal. The comparator then compares the value of the digital signal to a predetermined value. The comparator generates a comparator signal depending on the value of the digital signal and the predetermined value. The adjusting circuit then receives the comparator signal and adjusts the strength of the analog signal based upon the value of the comparator signal.

The preferred embodiments further relate to a method for operating a continuous self-calibrating circuit that monitors and adjusts an analog signal of an operating circuit. The method includes generating the analog signal and converting the analog signal to a digital signal. The method further includes comparing the value of the digital signal to a predetermined value and adjusting the strength of the analog signal. Further aspects and advantages of the invention are discussed below in conjunction with the preferred embodiments of the present invention.

DETAILED DESCRIPTION OF THE PRESENTLY PREFERRED EMBODIMENTS

Figure 1:
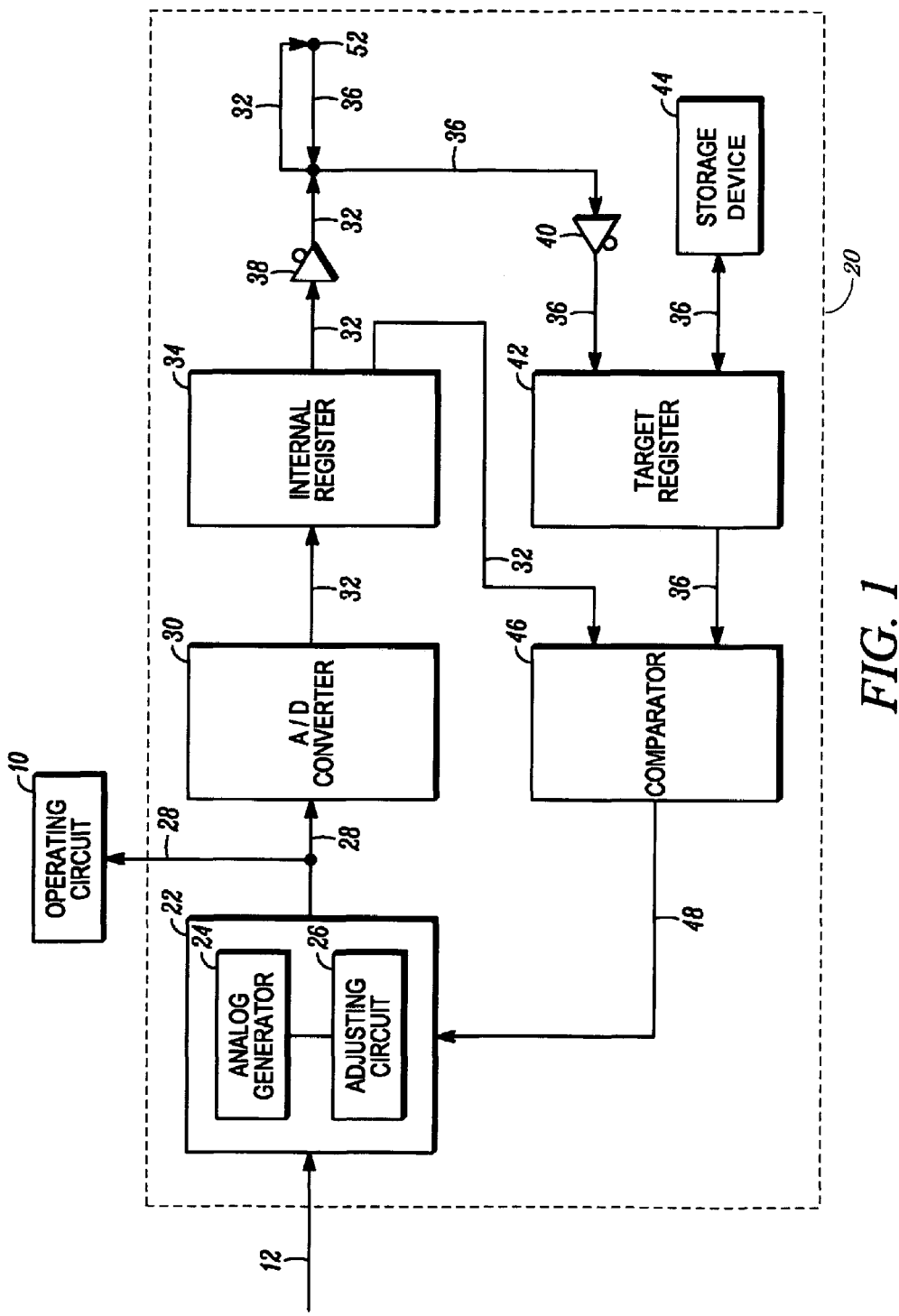
FIG. 1 depicts a block diagram of an exemplary continuous self-calibrating voltage circuit, according to one embodiment of the present invention.

Referring to FIG. 1, there is shown a block diagram of an exemplary continuous self-calibrating circuit 20 for monitoring and adjusting an analog signal 28. The continuous self-calibrating circuit 20 can be used in conjunction with an operating circuit 10 of an electronic device to, for example, monitor an internal voltage of the operating circuit 10. The operating circuit 10 includes any type of circuit that may be designed, such as, but not limited to, a memory circuit, a central processing unit circuit, or other such types of circuits. As will be appreciated by one of skill in the art, the present invention may be embodied as a method, data processing system or program product. Accordingly, the present invention may take the form of an embodiment consisting entirely of hardware, such as in a semiconductor device, as described below, an entirely software embodiment or an embodiment combining software and hardware aspects. Furthermore, the present invention may take the form of a computer program product on a computer-readable storage medium having computer-readable program code means embodied in the medium. Any suitable storage medium may be utilized including hard disks, CD-ROMs, DVD-ROMs, optical storage devices, or magnetic storage devices. The operating circuit may take the form of a semiconductor device, such as, but not limited to: an integrated circuit (e.g., memory cells such as SRAM, DRAM, EPROM, EEPROM, and the like); a programmable logic device; a data communications device; a clock generation device; and so forth. The continuous self-calibrating circuit 20 and the operating circuit may themselves be incorporated into a multitude of electronic devices, including but not limited to computers, automobiles, airplanes, satellites, and the like. In one embodiment, the continuous self-calibrating circuit 20 and the operating circuit are connected with a semiconductor device, such as a memory cell, and are used to adjust an analog signal, such as the voltage, of the semiconductor device, as illustrated in FIG. 1.

The operating circuit is connected with the continuous self-calibrating circuit 20, wherein the continuous self-calibrating circuit 20 generates an analog signal and the operating circuit receives the analog signal along path 28.

The analog signal may be any type of analog signal, such as an internal voltage signal, or a current. The internal voltage signal is the voltage that is used internally by the operating circuit to operate. The internal voltage signal is created by supplying an external voltage signal 12 to the analog generator 24, which converts the external voltage signal 12 to an internal voltage signal that is supplied along path 28 to the operating circuit 10.

The continuous self-calibrating circuit 20 includes a control circuit 22, an analog-to-digital converter 30, and a comparator 46. The control circuit comprises an analog generator 24 for generating the analog signal 28 and an adjusting circuit 26 for adjusting the strength of the analog signal 28. The analog generator 24 generates any type of analog signal, such as a voltage or a current. The amount or strength of the analog signal 28 can be adjusted by the adjusting circuit 26.

The analog-to-digital converter 30 receives the analog signal 28 and converts the analog signal 28 to a digital signal 32. The analog-to-digital converter 30 converts the analog signal 28 to the digital signal 32 using any one of a number of techniques know to those skilled in the art. Preferably, the analog-to-digital converter 30 converts the analog signal 28 to the digital signal 32 by generating a number of samples at a set rate and having a set word length. In one embodiment, the analog-to-digital converter 30 generates samples having M bits. The digital signal 32 comprises a plurality of digital samples each having a word length of M bits. Preferably the analog-to-digital converter 30 generates a digital signal 32 having samples with a word length of eight to ten bits, however, the digital signal 32 may have samples with any one of a number of word lengths. Additionally, the analog-to-digital converter 30 can generate a digital signal 32 having samples at any one of a number of frequencies.

The comparator 46 is in communication with the analog-to-digital converter 30 and receives the digital signal 32 and performs an operation on the digital signal 32. In one embodiment, the comparator 46 compares the digitial signal 32 to a predetermined value 36. In one embodiment, the digital signal 32 passes through the internal register 34 and to the comparator 46, as illustrated in FIG. 1, while in another embodiment, the digital signal 32 goes directly from the analog-to-digital converter 30 to the comparator 46. Upon receipt of the digital signal 32 and the predetermined value 36, the comparator 46 performs an operation on the digital signal 32 to the predetermined value 36 and then generates a comparator signal 48 depending on the value of the digital signal 32 and the predetermined value 36. The comparator 46 may perform any one of a number of operations, such as a Boolean operation, an addition operation, a subtraction operation, a multiplication operation, or a division operation, on the digital signal 32. For example, in one embodiment, the comparator 46 subtracts the value of the digital signal 32 from the predetermined value 36 and then generates a comparator signal 48. However, in another embodiment, the comparator 46 adds the value of the digital signal 32 to the predetermined value 36 and then generates a comparator signal 48.

The control circuit 22, and more specifically, the adjusting circuit 26, is connected with the comparator 46. The adjusting circuit 26 receives the comparator signal 48 and adjusts the strength of the analog signal based upon the value of the comparator signal. So for example, in one embodiment, if the digital signal has a value which represents 7 volts, and the predetermined value represents 5 volts, the comparator 46 may generate a comparator signal 48 which represents 2 volts, or the difference in value between the digital signal 32 and the predetermined value 36. In turn, the adjusting circuit 26 would instruct the analog generator 24 to generate an analog signal that is 2 volts less than the current analog signal 28. By continuously monitoring and adjusting the analog signal 28, the continuous self-calibrating circuit 20 allows the operating circuit to operate with a more stable and consistent analog signal 28 even under differing operating and environmental conditions. Additionally, the analog signal 28 can be adjusted in real-time without the need for special operating modes.

In one embodiment, the continuous self-calibrating circuit further comprises a storage device 44. The storage device 44 is used to store the predetermined value 36. The storage device 44 may be a series of fuses, a volatile memory device, a non-volatile memory, a CD-ROM, a DVD, a hard disk drive, a floppy disk drive, or any other device known to those skilled in the art which may be used to store digital data. Preferably, the storage device 44 uses non-volatile memory so that the predetermined value 36 may be permanently stored within the storage device 44.

In one embodiment, the continuous self-calibrating circuit 20 further comprises a serial input/output node 52 that is connected with the storage device 44 through a gated buffer 40 and the target register 42, as illustrated in FIG. 1. The predetermined value 36 can be input into the storage device 44 through the serial input/output node 52. Preferably, the continuous self-calibrating circuit 20 includes the gated buffer 40 between the serial input/output node 52 and the storage device 44 to prevent the digital signal 32 from entering the storage device 44, as illustrated in FIG. 1. The serial input/output node 52 is also connected with the analog-to-digital converter 30, wherein the digital signal 32 output from the analog-to-digital converter 30 may also be output through the serial input/output node 52. Preferably, the continuous self-calibrating circuit 20 includes a gated buffer 38 between the serial input/output node 52 and the analog-to-digital converter 30 in order to prevent the predetermined value 36 from entering the output of the analog-to-digital converter 30, as illustrated in FIG. 1. While the above-described continuous self-calibrating circuit 20 includes a serial input/output node 52, node 52 can communicate in either a parallel mode or a serial mode, depending on the application.

In one embodiment, the continuous self-calibrating circuit 20 comprises an internal register 34 which receives the digital signal 32 from the analog-to-digital converter 30, stores the digital signal 32 a period of time, and transmits the digital signal 32 to the comparator 46. In one embodiment, the internal register 34 also transmits the digital signal 32 to the serial input/output node 52. Preferably, a gated buffer 38 is located between the serial input/output node 52 and the internal register 34 in order to prevent the predetermined value 36 from entering the output of the internal register 34, as illustrated in FIG. 1.

In one embodiment, the continuous self-calibrating circuit 20 comprises a target register 42, wherein the target register 42 receives the predetermined value 36 from the serial input/output node 52, as illustrated in FIG. 1. Preferably, a gated buffer 40 is located between the serial input/output node 52 and the target register 42 in order to allow the predetermined value 36 to enter the target register 42 and to prevent the digital signal 32 from entering the target register 42, as illustrated in FIG. 1. Upon receiving the predetermined value 36, the target register 42 stores the predetermined value 36 in the storage device 44 for later retrieval. Upon storing the predetermined value 36 in the storage device 44, the target register can then receive the predetermined value 36 from the storage device 44 as needed.

In order to obtain the predetermined value 36, a look-up table between the analog signal 28 and the digital signal 32 must be created for the operating circuit. Therefore, for each value of the digital signal 32, a corresponding value for the analog signal 28 must be obtained. One method for creating the look-up table consists of supplying an externally controllable analog signal 28 to the analog-to-digital converter, and reading the value for the digital signal 32. Preferably, this sampling is done for more than one semiconductor device in order to obtain a controlled reading. A sampling of dies across multiple lots or a stable process is sufficient. Once the look-up table is created, the desired voltage obtained by inputting the value obtained for the digital signal 32 that corresponds to the desired value of the analog signal 28 on the look-up table. This value for the digital signal 32 is also referred to above as the predetermined value 36. Once the predetermined value 36 is input into the continuous self-calibrating circuit 20, and in particular, to the storage device 44, the continuous self-calibrating circuit 20 is able to generate an analog signal having the desired value.

The step size difference, or the difference in value, between the internal register 34 and the target register 42 is generated by the comparator 46 as a comparator signal 48. The comparator signal 48 is then sent to the adjusting circuit 26 to continuously adjust the value of the analog signal 28 until the step size difference, or difference in value, is zero or some predetermined allowable step size difference from zero. Whenever the value of the analog signal 28 fluctuates, either due to operating conditions or environmental conditions, the value of the digital signal 32 will change to reflect this fluctuation. The change in the value of the digital signal 32 will cause a change in the value of the comparator signal 48 received by the adjusting circuit 26, and then the adjusting circuit 26 will adjust the strength of the analog signal accordingly.

Figure 2:
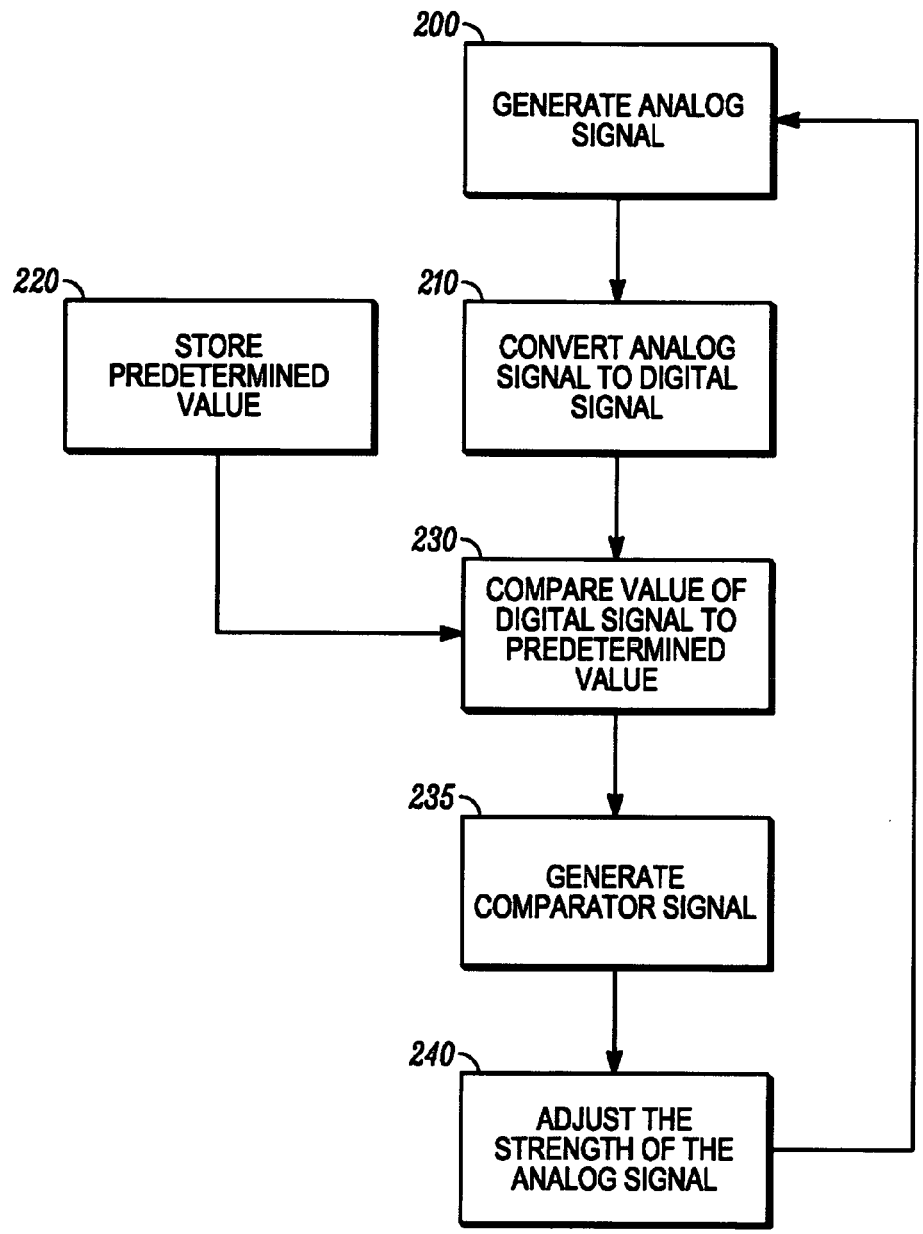
FIG. 2 depicts a flowchart illustration of methods, apparatus (systems) and computer program products, according to one embodiment of the present invention.

FIG. 2 is a flowchart illustration of methods, apparatus (systems) and computer program products according to the invention. It will be understood that each block of the flowchart illustrations, and combinations of blocks in the flowchart illustrations, can be implemented by computer program instructions or in semiconductor circuitry, or by a combination of both. These instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a storage medium that can direct a computer or other programmable data processing apparatus to function in a particular manner, such that the instructions stored in the storage medium produce an article of manufacture including instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 2 a generate analog signal operation is initiated in block 200. The generate analog signal operation generates an analog signal. Preferably, the analog signal is an internal voltage signal which is generated using an external voltage signal, wherein the internal voltage signal is used to power the circuitry in the operating circuit 10. The operating circuit 10 needs an internal voltage signal which is regulated within a set range in order to operate properly. Upon generating an analog signal, the analog signal is converted to a digital signal, as illustrated in block 210. The analog signal is converted to a digital signal in order to more easily compare the value of the analog signal to a predetermined value. A predetermined value 36 is stored, as illustrated in block 220. Preferably, the predetermined value 36 is stored in the continuous self-calibrating circuit 20, however, the predetermined value 36 may be stored in other places such as the operating circuit or at another location. The predetermined value 36 is used in order to later compare and adjust the strength of the analog signal.

Upon converting the analog signal to a digital signal, the value of the digital signal is compared to the predetermined value 36, as illustrated in FIG. 2. Upon comparing the value of the digital signal to the predetermined value 36, a comparator signal 48 is generated, as illustrated in block 235, and the strength of the analog signal, which is generated in block 200, is adjusted based upon the value of the comparator signal 48, as illustrated in block 240.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention.

I claim:

1. A continuous self-calibrating circuit for monitoring and adjusting an analog voltage signal of an operating circuit, comprising:

a control circuit having an analog generator for generating the analog voltage signal and having an adjusting circuit for adjusting the strength of the analog voltage signal;

an analog-to-digital converter that receives the analog voltage signal and converts the analog signal to a digital signal;

a storage device that stores a predetermined value;

a comparator that compares the value of the digital signal to the predetermined value, wherein the comparator generates a comparator signal in accordance with the value of the digital signal and the predetermined value, and wherein the adjusting circuit receives the comparator signal and adjusts the strength of the analog voltage signal based upon the value of the comparator signal; and a target register, wherein the target register receives the predetermined value from the storage device, wherein the comparator receives the predetermined value from the target register; and a gated buffer connected with the target register.

2. The continuous self-calibrating circuit of claim 1, further comprising a serial input/output node connected with the storage device, wherein the predetermined value can be input into the storage device through the serial input/output node.

3. The continuous self-calibrating circuit of claim 1, further comprising an internal register which receives the digital signal from the analog to digital converter, stores the digital signal a period of time, and transmits the digital signal to the comparator.

4. The continuous self-calibrating circuit of claim 3, further comprising a serial input/output node, wherein the digital signal can be output from the continuous self-calibrating circuit and the predetermined value can be input into the continuous self-calibrating circuit through the serial input/output node.

5. The continuous self-calibrating circuit of claim 1, wherein the comparator signal represents the difference in value between the digital signal and the predetermined value.

* * * * *